(12) United States Patent
Blackwell et al.

(10) Patent No.: US 8,341,376 B1
(45) Date of Patent: Dec. 25, 2012

(54) SYSTEM, METHOD, AND COMPUTER PROGRAM FOR REPARTITIONING DATA BASED ON ACCESS OF THE DATA

(75) Inventors: Cormac Blackwell, Dublin (IE); Niall O'Cuilinn, Dublin (IE)

(73) Assignee: Amdocs Software Systems Limited, Dublin (IE)

( * ) Notice: Subject to any disclaimer, the term of this patent is extended or adjusted under 35 U.S.C. 154(b) by 486 days.

(21) Appl. No.: 12/634,555

(22) Filed: Dec. 9, 2009

(51) Int. Cl.
*G06F 12/00* (2006.01)

(52) U.S. Cl. .......................................... 711/170; 711/114

(58) Field of Classification Search .................. 711/170, 711/114
See application file for complete search history.

(56) References Cited

U.S. PATENT DOCUMENTS

| | | | |
|---|---|---|---|
| 6,125,370 A | 9/2000 | Courter et al. | 707/202 |
| 6,223,182 B1 | 4/2001 | Agarwal et al. | 707/102 |
| 7,788,233 B1 * | 8/2010 | Iyer et al. | 707/661 |
| 2002/0035668 A1 * | 3/2002 | Nakano et al. | 711/114 |
| 2002/0174296 A1 * | 11/2002 | Ulrich et al. | 711/114 |
| 2004/0073747 A1 * | 4/2004 | Lu | 711/114 |
| 2009/0157776 A1 * | 6/2009 | McGarvey | 707/205 |

* cited by examiner

*Primary Examiner* — Hashem Farrokh (74) *Attorney, Agent, or Firm* — Zilka-Kotab, PC (57) ABSTRACT

A system, method, and computer program product are provided for repartitioning data based on access of the data. In use, an addition of a new partition in memory to at least one existing partition in the memory across which data is stored is detected. Additionally, access to a portion of the data is identified. Further, one of the at least one existing partition in the memory in which the portion of the data is stored is determined. Moreover, the portion of the data is repartitioned from the one of the at least one existing partition to the new partition while allowing access to other portions of the data, in response to the identification of the access to the portion of the data.

16 Claims, 5 Drawing Sheets

SYSTEM, METHOD, AND COMPUTER PROGRAM FOR REPARTITIONING DATA BASED ON ACCESS OF THE DATA

FIELD OF THE INVENTION

The present invention relates to data partitions, and more particularly to repartitioning data.

BACKGROUND

When working with large datasets, data is often split or partitioned across multiple partitions (e.g. disks, machines, etc.). Generally, a function is applied to some field or part of a data entry to find the partition in which it should be stored. If the amount of data grows, then the number of the partitions may be insufficient to store the data and the data may thus be repartitioned across more partitions. Current techniques for repartitioning data have exhibited various limitations. For example, repartitioning has conventionally been a time intensive process, restricted access to the data while the repartitioning is taking place (e.g. which can lead to downtime for a system), etc.

There is thus a need for addressing these and/or other issues associated with the prior art.

SUMMARY

A system, method, and computer program product are provided for repartitioning data based on access of the data. In use, an addition of a new partition in memory to at least one existing partition in the memory across which data is stored is detected. Additionally, access to a portion of the data is identified. Further, one of the at least one existing partition in the memory in which the portion of the data is stored is determined. Moreover, the portion of the data is repartitioned from the one of the at least one existing partition to the new partition while allowing access to other portions of the data, in response to the identification of the access to the portion of the data.

DETAILED DESCRIPTION

Figure 1:
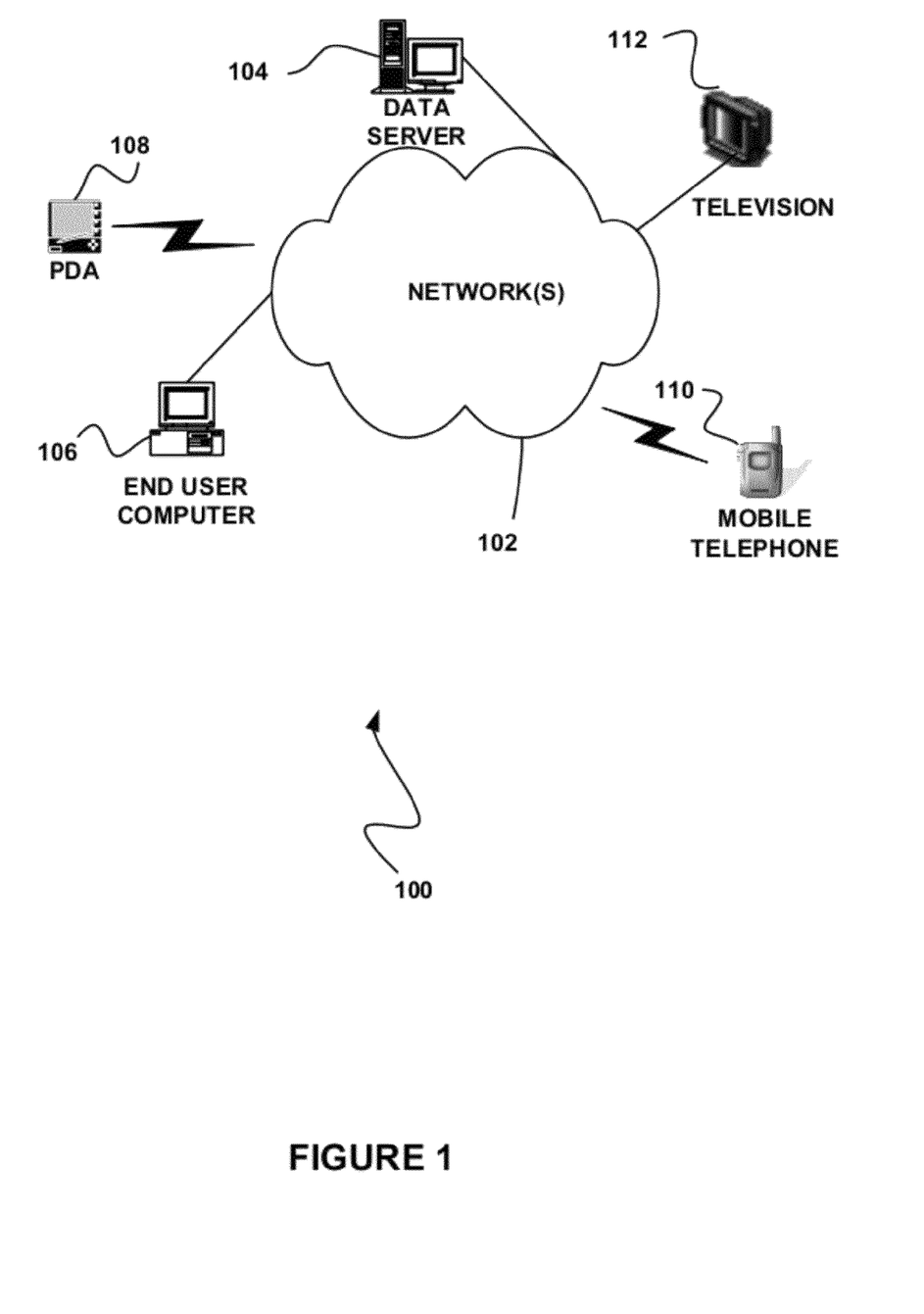
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
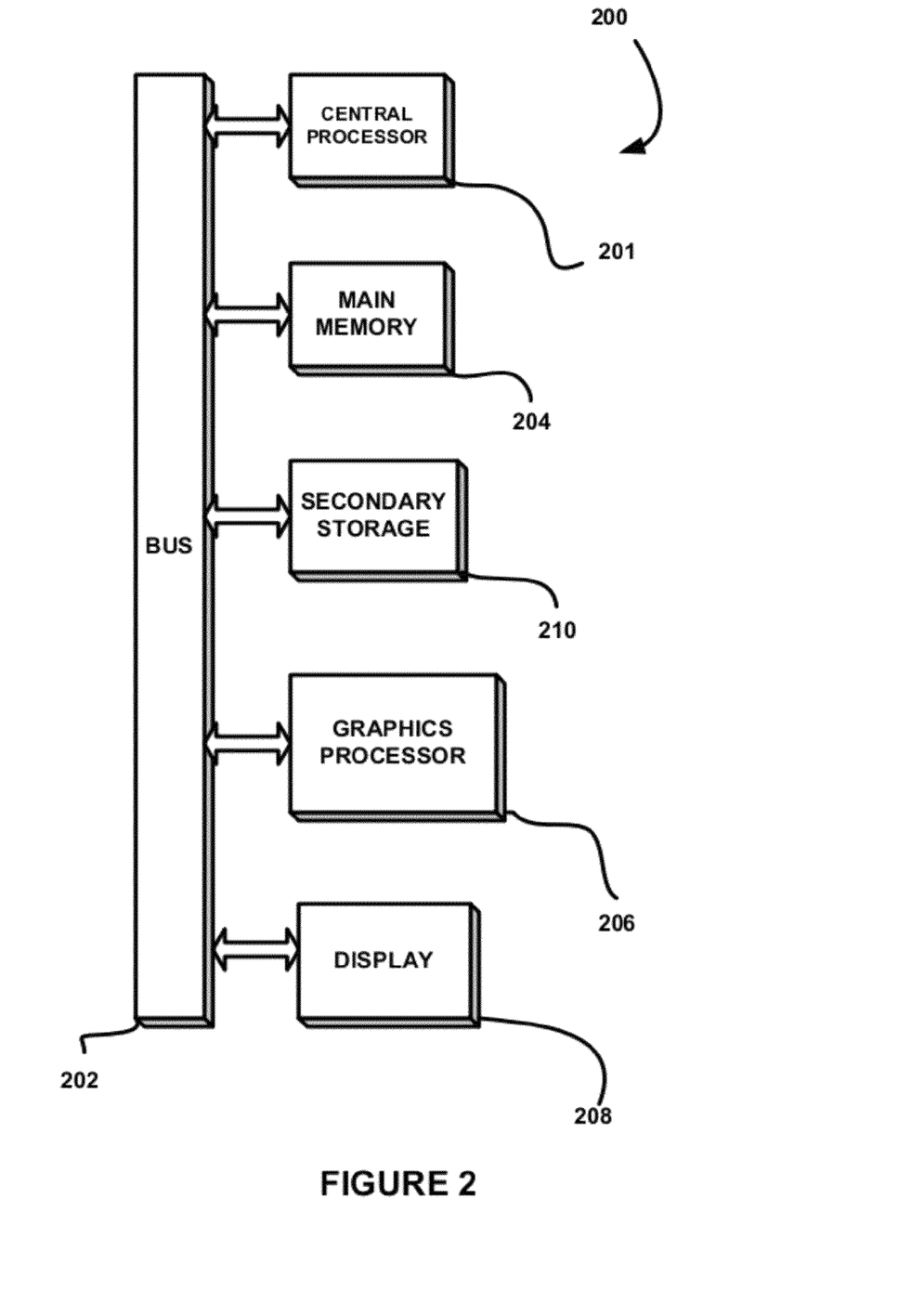
FIG. 2 illustrates an exemplary system, in accordance with another embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
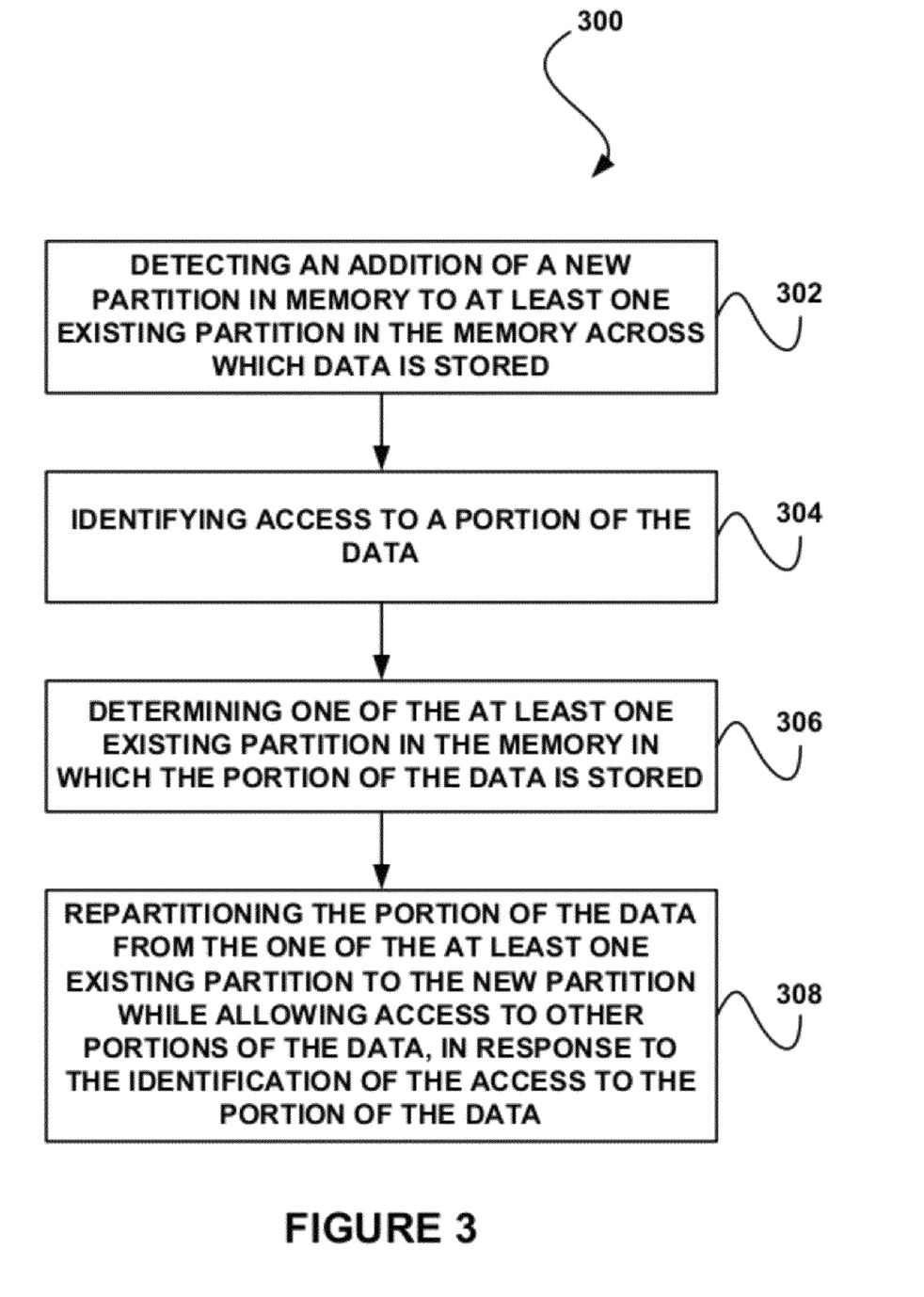
FIG. 3 illustrates a method for repartitioning data based on access of the data, in accordance with another embodiment.

FIG. 3 illustrates a method 300 for repartitioning data based on access of the data, in accordance with another embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an addition of a new partition in memory to at least one existing partition in the memory across which data is stored is detected. In the context of the present description, the memory may include at least one section of memory (e.g. of a single device, across multiple devices, etc.) that has been apportioned into the at least one existing partition and the new partition. For example, the new partition and the existing partition(s) may each include a different hard disk (e.g. hard drive), a different server, etc.

To this end, the data may optionally include a dataset, where the dataset has been partitioned across the existing partition(s). For example, various portions of the data may be stored in different ones of the existing partition(s). It should be noted that the data may include any type of data that is capable of being accessed from the existing partition(s).

In one embodiment, the new partition may be added to the existing partition(s) in response to a determination that the existing partition(s) have an insufficient amount of memory to store an amount of data desired to be stored across the existing partition(s). In another embodiment, the addition of the new partition may be detected based on the determination of the aforementioned insufficiency of the existing partition(s). Of course, however, the addition of the new partition may be detected in any desired manner.

Additionally, as shown in operation 304, access to a portion of the data is identified. In the context of the present description, the portion of the data may include any portion (e.g. subset, etc.) of the data that is stored in one of the existing partition(s) and that is capable of being accessed. For example, the portion of the data may include a data object, such as an electronic document, folder, code, and/or any other type of data that is capable of being accessed.

In one embodiment, the access to the portion of the data may include reading the portion of the data. In another embodiment, the access to the portion of the data may include writing the portion of the data. Of course, however, the portion of the data may be accessed in any manner.

Optionally, the access to the portion of the data may be initiated (e.g. requested) by a user, an application, an operating system, an automated process, etc. In one embodiment, the access to the portion of the data may be identified by an application monitoring access to the data. For example, the access to the portion of the data may be identified by an application monitoring a user device and/or the aforementioned application, operating system, automated process, etc.

Further, as shown in operation 306, one of the at least one existing partition in the memory in which the portion of the data is stored is determined. In one embodiment, at least one existing partitioning function associated with the existing partition(s) may be applied to the portion of the data for determining one of the existing partition(s) in the memory in which the portion of the data is stored. Such existing partitioning function may be capable of being utilized for storing data in the existing partition in the memory in which the portion of the data is stored. It should be noted that the existing partitioning function may include a hash function (e.g. a hash code based on a number of the partitions, a hashing algorithm, etc.), may use a data range, etc.

For example, each of the existing partitions may be associated with a different (e.g. unique) existing partitioning function, such that an existing partitioning function may be utilized for storing data in the associated existing partition. To determine the existing partition in which the portion of the data is stored, an existing partitioning function may be applied to the portion of the data (e.g. and a result of such application of the existing partitioning function compared to contents of the associated existing partition). Optionally, the existing partitioning functions may be applied to the portion of the data in order of the creation of the associated existing partitions (e.g. from most recently created to least recently created), until the existing partition in which the portion of the data is stored is determined.

Moreover, the portion of the data is repartitioned from the one of the at least one existing partition to the new partition while allowing access to other portions of the data, in response to the identification of the access to the portion of the data. Note operation 308. With respect to the present description, repartitioning the portion of the data may include moving the portion of the data from the existing partition in which the portion of the data is stored to the new partition. Optionally, only the portion of the data may be repartitioned in operation 308 in response to the identification of the access to the portion of the data, thus avoiding repartitioning of other portions of the data in response to identification of the access to the portion of the data.

Accordingly, the portion of the data may be repartitioned in response to a determination that the new partition has been added (e.g. created) to the existing partition(s). As noted above with respect to operation 306, the portion of the data may also be repartitioned in response to a determination that the portion of the data is not already stored in the new partition. For example, the portion of the data may be repartitioned in response to a determination that the portion of the data is stored in one of the existing partition(s).

In one embodiment, the portion of the data may be repartitioned from the existing partition in the memory in which it is stored to the new partition in the memory (e.g. moved from the existing partition in which it is stored to the new partition) by applying a new partitioning function to the portion of the data. For example, the new partitioning function (e.g. hash function, etc.) applied to the portion of the data may be associated with new the partition to which the portion of the data is repartitioned. Thus, for example, the new partitioning function may be utilized to store (e.g. insert) the portion of the data in the new partition in the memory.

In another embodiment, the portion of the data may be repartitioned from the existing partition in the memory in which it is stored to the new partition in the memory by removing the portion of the data from the first partition. For example, repartitioning the portion of the data may include removing the portion of the data from the existing partition in the memory in which the data is stored after the portion of the data is inserted in the new partition in the memory. In this way, duplicate copies of the portion of the data may be prevented from being stored across multiple partitions.

Moreover, as noted above, access (e.g. reading, writing, etc.) to the other portions of the data is allowed during the repartitioning of the portion of the data for which the access thereto was identified. For example, by repartitioning only the portion of the data in response to the identification of the access to the portion of the data, repartitioning of other portions of the data may be avoided such that access thereto is allowed during the aforementioned repartitioning. As another example, each of the other portions of the data may similarly be repartitioned in response to access being made to such other portion of the data, in the manner described above. Of course, however, access to the other portions of the data (e.g. all of the other portions of the data) may be allowed during the repartitioning of the portion of the data in any desired manner.

Furthermore, data may be gradually moved between partitions as the data is used so that the data is eventually in the new partition. This gradual movement may, in one optional embodiment, eliminate downtime with respect to a system for allowing the access to the other portions of the data. In addition, the gradual movement may, in one embodiment, have minimal performance impact.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4A:
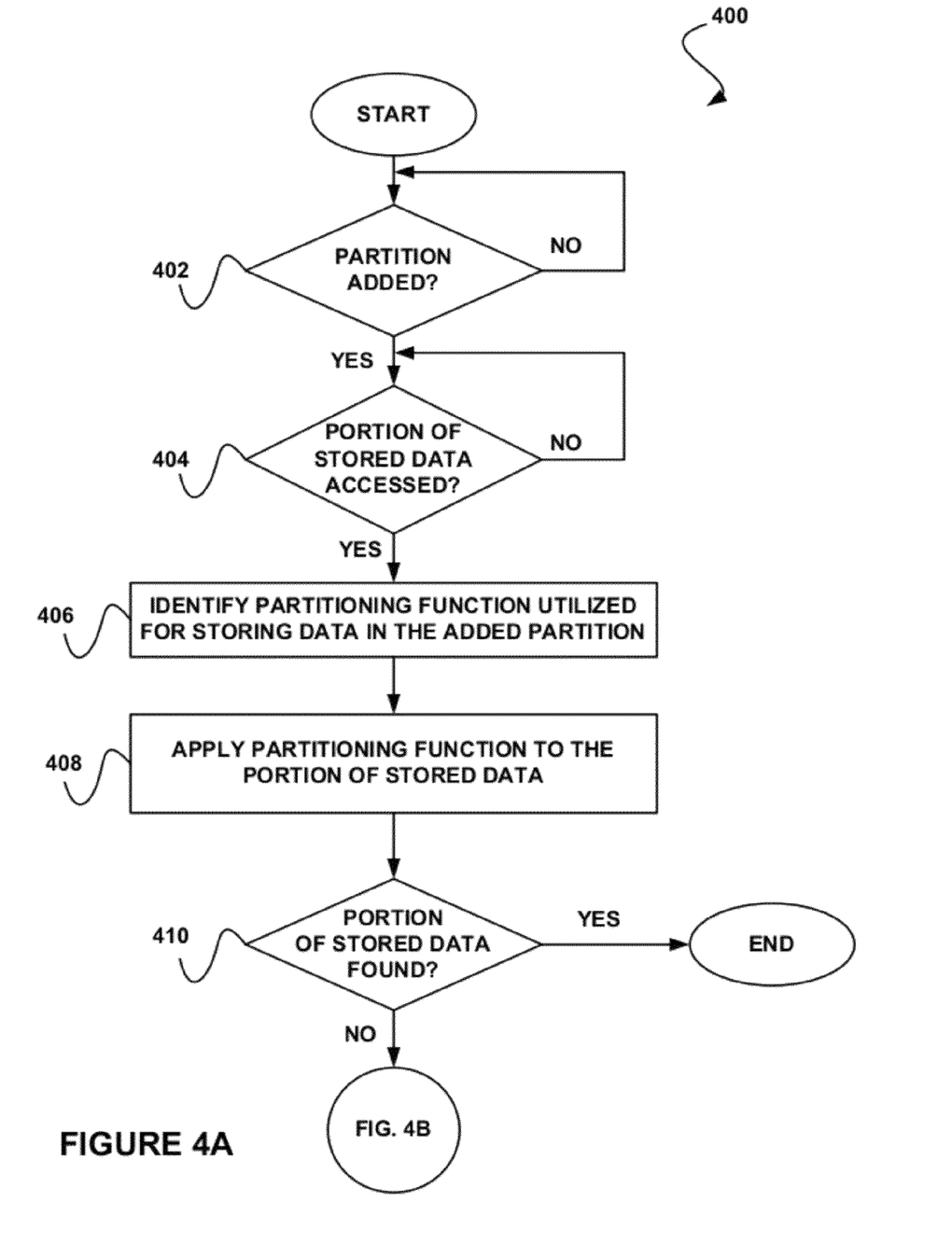
FIGS. 4A-B illustrates a method for repartitioning data when a new partition is added based on access of the data, in accordance with yet another embodiment.
Figure 4B:
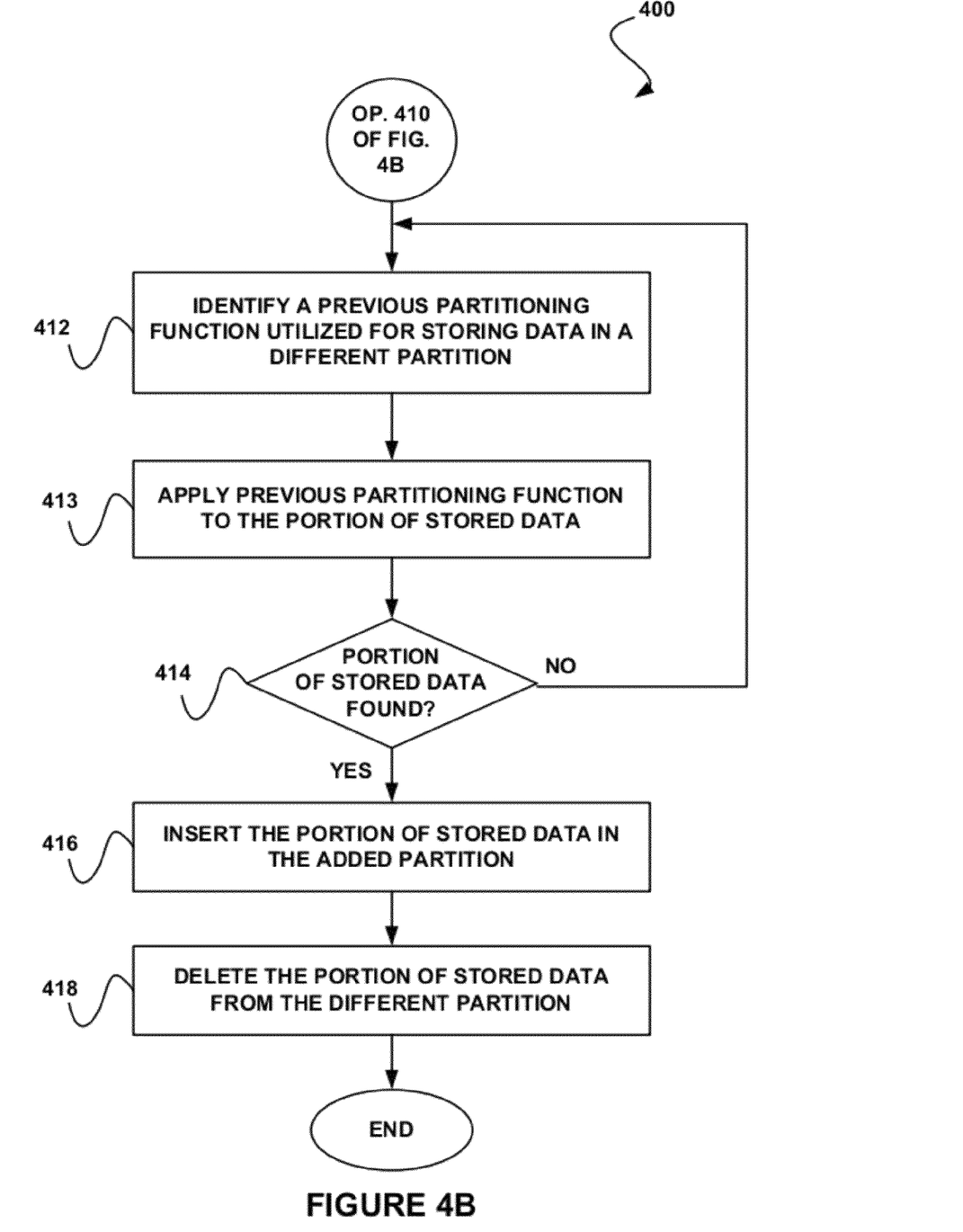

FIGS. 4A-B illustrates a method 400 for repartitioning data when a new partition is added based on access of the data, in accordance with yet another embodiment. As an option, the method 400 may be carried out in the context of the details of FIGS. 1-3. Of course, however, the method 400 may be carried out in any desired environment. Further, the aforementioned definitions may equally apply to the description below.

As shown in decision 402, it is determined whether a partition has been added. With respect to the present embodiment, it may be determined that a partition has been added in response to an identification of a newly created partition across which a data set may be partially partitioned. For example, the newly created partition may be identified as a result of a determination that the entirety of the current partitions across which the data is stored is insufficient to store an addition to the data.

If it is determined that that a partition has not been added, the method 400 continues to wait for a determination that a partition has been added. However, if it is determined that a partition has been added, it is determined whether a portion of stored data is accessed. See decision 404. The stored data may include any data stored with respect to the partitions. For example, it may be determined whether a portion of stored data has been read, written, etc.

If it is determined that a portion of stored data is not accessed, the method 400 continues to wait for a determination that a portion of stored data has been accessed. If it is determined that a portion of stored data is accessed, a partitioning function utilized for storing data in the added partition is identified. See operation 406. For example, each partition across which the data may be stored may be associated with a different partitioning function. The partitioning function may be utilized in storing a portion of the data in the partition with which the partitioning function is associated.

In one embodiment, each of the different partitioning functions may be stored in a database for allowing the identification of such partitioning functions. The database may also store in association with each partitioning function a timestamp or any other indicator such that a sequence in which the associated partitions were created may be ascertained, the reasons for which will be described below. Thus, the partitioning function utilized for storing data in the added partition may optionally be identified from the database. Once the partitioning function utilized for storing data in the added partition is identified, the partitioning function is applied to the portion of the stored data, as shown in operation 408. For example, the partitioning function (e.g. a hash function, etc.) may be applied to an entirety of the portion of the data, a field of the portion of the data, etc.

Further, it is determined whether the portion of the stored data is found, as shown in decision 410. With respect to the present embodiment, the determination of whether the portion of the stored data is found may include determining whether the portion of the stored data is found in the added partition. In one embodiment, the determination of whether the portion of the stored data is found may be based on the application of the partitioning function to the portion of the stored data. For example, the partitioning function may be applied to the portion of the stored data to find the added partition, and it may be determined whether the portion of the stored data is in the added partition (e.g. by scanning the added partition for the portion of the stored data, etc.).

If it is determined that the portion of the stored data is found in the added partition, the method 400 is terminated. In particular, the method 400 may end since the portion of the stored data is already located in the most recently added partition (e.g. as a result of the portion of the stored data previously being repartitioned to the added partition in response to a previous access to the portion of the stored data).

If, however, it is determined that the portion of the stored data is not found in the added partition, a previous partitioning function utilized for storing data in a different partition is identified. Note operation 412. The different partition may include the partition added immediately prior to the added partition identified in decision 402 (e.g. the second most recently added partition). In one embodiment, the previous partitioning function may be identified from the database storing the partitioning functions associated with the various partitions across which the data may be stored. For example, the timestamp, etc. associated with the partitioning function may be used for identifying the particular previous partitioning function that is associated with the partition added immediately prior to the added partition identified in decision 402.

Still yet, the previous partitioning function is applied to the portion of the stored data, as shown in operation 413. The previous partitioning function may be applied to the portion of the stored data in the manner described above with respect to operation 408. It is then determined whether the portion of the stored data is found, as shown in decision 414.

As noted above, the determination of whether the portion of the stored data is found may include determining whether the portion of the stored data is found in the different partition described above. In one embodiment, the determination of whether the portion of the stored data is found may be based on the application of the previous partitioning function to the portion of the stored data. For example, the previous partitioning function may be applied to the portion of the stored data to find the different partition, and it may be determined whether the portion of the stored data is in the different partition (e.g. by scanning the different partition for the portion of the stored data, etc.).

If it is determined that the portion of the stored data is not found, the method 400 returns to operation 412 where yet another previous partitioning function utilized for storing data in yet a different partition is identified. For example, the next identified different partition may include a partition added immediately prior to the different partition described above. In this way, each partition may be checked for the portion of the stored data based on the order in which the partitions are added, until the portion of the stored data is found.

It should be noted that while the accessed portion of the stored data is described above as including data stored in one of the partitions, the accessed portion of data, or the data itself, may not necessarily be stored in any of the partitions. In such embodiment, each partition may be checked for the accessed portion of data and may not be found. Optionally, if the accessed portion of data is not found in any of the partitions, the method 400 may terminate, as the accessed portion of data is not a portion of data that is partitioned across the partitions.

Once it is determined that the portion of the stored data is found, the portion of the stored data is inserted in the added partition identified in decision 402, such that access to the other portions of the data is allowed. See operation 416. For example, the portion of the stored data may be written to the added partition. Further, the portion of the stored data is deleted from the different partition in which it was found, as shown in operation 418. In this way, the portion of the stored data may be repartitioned from the different partition in which it was found to the added partition.

Just by way of example, a first partition in which data may be stored may be found using a partitioning function f1. When a new partition is added, the function f1 is replaced by a new partitioning function f2. However, both partitioning functions f1 and f2 are stored.

When the portion of the stored data is read, the partitioning function f2 is first applied to the portion of the stored data. If the portion of the stored data is not found in the new partition, the partitioning function f1 is applied to the portion of the stored data and the first partition is checked to determine whether the portion of the stored data is located in the first partition. If the portion of the stored data is found in the first partition, it is first inserted into the new partition and then deleted from the first partition.

While not shown above with respect to FIGS. 4A-B, portions of stored data may also optionally be written without first being read, or may be read before the added partition is created and written after the added partition is created. Thus, to avoid two copies of a portion of stored data (e.g. one up-to-date copy in the added partition, and one out-of-date copy in the other partition in which it was stored), each portion of stored data (e.g. being used by an application) may be associated with a time during which it was last read.

For portions of stored data which are being written without being read, the time may be set to a marker value, or an earliest possible time. When the portion of stored data is subsequently written, the last read time is checked against the time the partitions were last changed (i.e. the time the added partition was created). If the last read time is before the partition change time, then the portion of stored data is stored in the added partition, and deleted from any other partition in which it is located.

For example, the portion of the data for which access is identified may be associated with a last read time indicative of a last read (e.g. a time of a last read) of the portion of the data. Thus, where access to the portion of the data includes writing the portion of the data without reading the portion of the data, the last read time associated with such portion of the data may be compared to a time the partition in the memory was added when the portion of the data is written. Further, the portion of the data may only be repartitioned to the added partition and removed from the existing partition in which it is stored in response to a determination that the last read time occurred before a time the new partition in the memory was added.

As an option, there may be some portions of the stored data that are infrequently or never accessed, such that these portions of stored data may never be repartitioned to newly added partitions. In one embodiment, a process (e.g. low priority process) that accesses all portions of the stored data may be performed (e.g. periodically, on-demand, etc.) for ensuring that all portions of the stored data is eventually repartitioned. In such embodiment, once all of the portions of the stored data are repartitioned via the aforementioned process, partitioning functions associated with partitions from which the portions of the stored data have been moved may be discarded (e.g. removed from the database in which they are stored).

By discarding the partitioning functions associated with partitions from which the portions of the stored data have been moved, subsequent searches for accessed portions of data may avoid applying such discarded partitioning functions to the accessed portions of data for determining if the accessed portions of data are stored in the associated partitions. Thus, the number of partitions for which it is determined if the accessed portions of data exist may be reduced, particularly when the accessed portion of data is not stored in any of the partitions and each partition is therefore checked for the accessed portion of data.

Of course, in another embodiment, the portions of stored data may be allowed to be infrequently or never accessed (thereby avoiding execution of the aforementioned process). With respect to such embodiment, all partitioning functions associated with partitions in which the portions of stored data are capable of being stored may be maintained in the database.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a tangible computer readable medium, comprising:
    computer code for detecting an addition of a new partition in memory to at least one existing partition in the memory in which data is stored;
    computer code for identifying access to a portion of the data;
    computer code for determining one of the at least one existing partition in the memory in which the portion of the data is stored; and
    computer code for repartitioning the portion of the data from the one of the at least one existing partition to the new partition while allowing access to other portions of the data, in response to the identification of the access to the portion of the data;
    wherein the computer program is operable such that the portion of the data is associated with a last read time indicative of a last read of the portion of the data;
    wherein the access to the portion of the data includes writing the portion of the data without reading the portion of the data, and the computer program is operable such that when the portion of the data is written the portion of the data is repartitioned to the new partition in the memory and removed from the one of the at least one existing partition in the memory in response to a determination that the last read time occurred before a time the new partition in the memory was added.

2. The computer program of claim 1, wherein the data includes a dataset partitioned across a plurality of existing partitions in the memory.

3. The computer program of claim 2, wherein each of the existing partitions in the memory includes a different hard disk.

4. The computer program of claim 2, wherein each of the existing partitions in the memory includes a different server.

5. The computer program of claim 2, wherein the computer program is operable such that the other portions of the data are stored in different ones of the existing partitions in the memory.

6. The computer program of claim 1, wherein the computer program is operable such that the access to the portion of the data is initiated by an automated process.

7. The computer program of claim 1, wherein the computer program is operable such that at least one existing partitioning function associated with the at least one existing partition is applied to the portion of the data for determining the one of the at least one existing partition in the memory in which the portion of the data is stored.

8. The computer program of claim 7, wherein the at least one existing partitioning function is utilized for storing the data in the at least one existing partition in the memory.

9. The computer program of claim 1, wherein the computer program is operable such that the portion of the data is repartitioned from the one of the at least one existing partition in the memory to the new partition in the memory by applying a new partitioning function to the portion of the data.

10. The computer program of claim 9, wherein the new partitioning function includes a hash function.

11. The computer program of claim 9, wherein the new partitioning function is utilized to store the portion of the data in the new partition in the memory.

12. The computer program of claim 1, wherein the computer program is operable such that repartitioning the portion of the data inserts the portion of the data in the new partition in the memory.

13. The computer program of claim 12, wherein the computer program is operable such that repartitioning the portion of the data removes the portion of the data from the one of the at least one existing partition in the memory after the portion of the data is inserted in the new partition in the memory.

14. A method, comprising:
    detecting an addition of a new partition in memory to at least one existing partition in the memory across which data is stored;

identifying access to a portion of the data;
determining one of the at least one existing partition in the memory in which the portion of the data is stored; and
repartitioning the portion of the data from the one of the at least one existing partition to the new partition while allowing access to other portions of the data, in response to the identification of the access to the portion of the data, utilizing a processor;
wherein the portion of the data is associated with a last read time indicative of a last read of the portion of the data;
wherein the access to the portion of the data includes writing the portion of the data without reading the portion of the data, and when the portion of the data is written the portion of the data is repartitioned to the new partition in the memory and removed from the one of the at least one existing partition in the memory in response to a determination that the last read time occurred before a time the new partition in the memory was added.

15. A system, comprising;
memory;
a processor in communication with the memory, the processor configured to:
   detect an addition of a new partition in the memory to at least one existing partition in the memory across which data is stored;
   identify access to a portion of the data;
   determine one of the at least one existing partition in the memory in which the portion of the data is stored; and
   repartition the portion of the data from the one of the at least one existing partition to the new partition while allowing access to other portions of the data, in response to the identification of the access to the portion of the data;
   wherein the system is operable such that the portion of the data is associated with a last read time indicative of a last read of the portion of the data;
   wherein the access to the portion of the data includes writing the portion of the data without reading the portion of the data, and the system is operable such that when the portion of the data is written the portion of the data is repartitioned to the new partition in the memory and removed from the one of the at least one existing partition in the memory in response to a determination that the last read time occurred before a time the new partition in the memory was added.

16. The system of claim 15, wherein the processor is coupled to the memory via a bus.

* * * * *

UNITED STATES PATENT AND TRADEMARK OFFICE
CERTIFICATE OF CORRECTION

| | | |
|---|---|---|
| PATENT NO. | : 8,341,376 B1 | Page 1 of 1 |
| APPLICATION NO. | : 12/634555 | |
| DATED | : December 25, 2012 | |
| INVENTOR(S) | : Blackwell et al. | |

It is certified that error appears in the above-identified patent and that said Letters Patent is hereby corrected as shown below:

In the claims:

Col. 9, line 19; please replace "comprising;" with --comprising:--.

Signed and Sealed this
Twenty-first Day of April, 2015

Michelle K. Lee
*Director of the United States Patent and Trademark Office*